(12) United States Patent
Wang et al.

(10) Patent No.: US 10,833,835 B2
(45) Date of Patent: Nov. 10, 2020

(54) METHOD AND DEVICE FOR TRANSMITTING INFORMATION

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/611,208

(22) PCT Filed: Mar. 26, 2018

(86) PCT No.: PCT/CN2018/080538
§ 371 (c)(1),
(2) Date: Nov. 5, 2019

(87) PCT Pub. No.: WO2018/201824
PCT Pub. Date: Nov. 8, 2018

(65) Prior Publication Data
US 2020/0145170 A1    May 7, 2020

(30) Foreign Application Priority Data
May 5, 2017  (CN) .......................... 2017 1 0314163

(51) Int. Cl.
*H04L 5/00*  (2006.01)
*H04W 72/04*  (2009.01)

(52) U.S. Cl.
CPC ......... *H04L 5/0094* (2013.01); *H04W 72/042* (2013.01); *H04W 72/0446* (2013.01); *H04W 72/0453* (2013.01)

(58) Field of Classification Search
CPC ............ H04L 5/0094; H04W 72/0446; H04W 72/042; H04W 72/0453
See application file for complete search history.

(56) References Cited

U.S. PATENT DOCUMENTS

2019/0174440 A1* 6/2019 Kwak ............... H04W 52/0216
2019/0229879 A1* 7/2019 Yi ......................... H04L 1/0038
2019/0372739 A1* 12/2019 Li ......................... H04L 5/0094

FOREIGN PATENT DOCUMENTS

CN     103959872 A    7/2014
CN     104756433 A    7/2015
(Continued)

OTHER PUBLICATIONS

VIVO: "Duscussion on NR resource allocation", 3GPP TSG RAN WG1; R1-1704501, Spokane, USA Apr. 3, 2017-Apr. 7, 2017.
(Continued)

*Primary Examiner* — Hassan Kizou
*Assistant Examiner* — Abdullahi Ahmed
(74) *Attorney, Agent, or Firm* — Kilpatrick Townsend & Stockton, LLP

(57) ABSTRACT

A method and device for transmitting information, for solving the problem that at present there is no solution configured to use a group common physical downlink control channel (PDCCH) to transmit information related with a group of terminals. In the embodiments of the present disclosure, a base station determines information of a group of terminals to be sent; and the base station uses, within a set of resources of a group common PDCCH corresponding to the group of terminals, a fixed subcarrier space or different subcarrier spaces to send the information of the group of terminals.

8 Claims, 7 Drawing Sheets

(56) References Cited

FOREIGN PATENT DOCUMENTS

CN  106454923 A  2/2017
WO  2016171765 A1  10/2016

OTHER PUBLICATIONS

LG Electronics: "Discussion on slot structure indication", 3GPP TSG RAN WG1; R1-1704902, Spokane, USA; Apr. 3, 2017-Apr. 7, 2017.
LG Electronics: "Considerations on PDCCH design for URLLC", 3GPP TSG RAN WG1; R1-1704905, Spokane, USA; Apr. 3, 2017-Apr. 7, 2017.

* cited by examiner

METHOD AND DEVICE FOR TRANSMITTING INFORMATION

This application is a National Stage of International Application No. PCT/CN2018/080538, filed on Mar. 26, 2018, which claims priority to a Chinese patent application No. 201710314163.0 titled Method and Device for Transmitting Information filed to China Patent Office on May 5, 2017, both of which are incorporated by reference herein in their entireties.

FIELD

The present disclosure relates to the technical field of wireless communications and particularly relates to a method and device for transmitting information.

BACKGROUND

Along with development of mobile technologies, a mobile communication system needs to provide lower network delay and support richer types of service in the future. In an LTE (Long Term Evolution) system, a PDCCH (physical downlink control channel) is configured to carrying dispatching information and other control information, and a control region of each downlink subframe may include a plurality of PDCCHs.

The PDCCH is configured to informing or dispatching one terminal or informing or dispatching all terminals in a base station or informing or dispatching a group of terminals in the base station. Along with development of wireless communication systems, downlink control channels are richer in category and more flexible in transmission mode. In the existing LTE systems, UE (User Equipment) performs blind detection on PDCCH corresponding to the UE in a CSS (Common search space) or USS (UE-specific search space) according to information expected to be obtained, for example, the UE detects PDCCH for receiving and dispatching mono-cast data in the USS and detects PDCCH for receiving and dispatching broadcast data in the CSS. In the LTE systems, a subcarrier space of subcarrier where resources used by a downlink control channel during data transmission are located is fixed; and prospective mobile communication systems need to support different subcarrier spaces, terminals need to support a variety of subcarrier spaces, for example, different subcarrier spaces are used to transmit data in the same or different slots. In the prospective mobile communication systems, a group common PDCCH for dispatching or informing information related with a group of terminals is required to be introduced, and a solution for transmitting the information related with the group of terminals by using the group common PDCCH is absent at present when a base station needs to send the information related with the group of terminals by using different subcarrier spaces.

In summary, a solution for transmitting the information related with the group of terminals by using the group common PDCCH is absent at present when the base station needs to send the information related with the group of terminals by using different subcarrier spaces.

SUMMARY

The present disclosure provides a method and device for transmitting information. The method and the device are configured to solving the problem in the prior art that a solution for transmitting information related with a group of terminals by using a group common PDCCH is absent when a base station needs to send the information related with the group of terminals by using different subcarrier spaces.

Based on the above-mentioned problem, in a first aspect, one embodiment of the present disclosure provides a method for transmitting information, including:

determining, by a base station information of a group of terminals to be sent; and using, by the base station, within a set of resources of a group common PDCCH corresponding to the group of terminals, a fixed subcarrier space or different subcarrier spaces to send the information of the group of terminals.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in a same slot.

Optionally, the using, by the base station, within the set of resources of the group common PDCCH corresponding to the group of terminals, different subcarrier spaces to send the information of the group of terminals includes:

for any subcarrier space in the slot, using, by the base station, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the using, by the base station, within the set of resources of the group common PDCCH corresponding to the group of terminals, different subcarrier spaces to send the information of the group of terminals includes:

for any slot, using, by the base station, within a set of resources of a group common PDCCH corresponding to the slot, a subcarrier space corresponding to the slot to send the information of the group of terminals on the group common PDCCH.

Optionally, the base station informs terminals of a subcarrier space used for sending a group common PDCCH through explicit signaling.

In a second aspect, one embodiment of the present disclosure further provides a method for transmitting information, including:

detecting, by a terminal a group common PDCCH corresponding to a group of terminals where the terminal is located; and using, by the terminal, within a set of resources of a group common PDCCH corresponding to the group of terminals, a fixed subcarrier space or different subcarrier spaces to receive information of the group of terminals sent from a base station.

Optionally, the fixed subcarrier space is a subcarrier space used by the base station during sending of the set of resources of the common downlink control channel.

Optionally, the different subcarrier spaces include subcarrier spaces used by the terminals during sending and receiving of data in a same slot.

Optionally, the using, by the terminal, within the set of resources of the group common PDCCH corresponding to the group of terminals, different subcarrier spaces to receive the information of the group of terminals sent from the base station includes:

for any subcarrier space in the slot, using, by the terminal, within a set of resources of a group common PDCCH corresponding to the subcarrier space, the subcarrier space to receive the information of the group of terminals on the group common PDCCH.

Optionally, the different subcarrier spaces include subcarrier spaces corresponding to each slot.

Optionally, the using, by the terminal, within the set of resources of the group common PDCCH corresponding to the group of terminals, different subcarrier spaces to receive the information of the group of terminals sent from the base station includes:

for any slot, using, by the terminal, within a set of resources of a group common PDCCH corresponding to the slot, a subcarrier space corresponding to the slot to receive the information of the group of terminals sent from the base station on the group common PDCCH.

Optionally, a subcarrier space used for sending a group common PDCCH by terminals is informed by a base station through explicit signaling.

In a third aspect, one embodiment of the present disclosure further provides a base station for transmitting information, including:

a determining device configured to determine information of a group of terminals to be sent; and a sending device configured to use, within a set of resources of a group common PDCCH corresponding to the group of terminals, a fixed subcarrier space or different subcarrier spaces to send the information of the group of terminals.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in the same slot.

Optionally, the sending device is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the sending device is configured to:

for any slot, use, within a set of resources of a group common PDCCH corresponding to the slot, a subcarrier space corresponding to the slot to send the information of the group of terminals on the group common PDCCH.

Optionally, the base station informs terminals of a subcarrier space used for sending a group common PDCCH through explicit signaling.

In a fourth aspect, one embodiment of the present disclosure further provides a terminal for transmitting information, including:

a detecting device configured to detect a group common PDCCH corresponding to a group of terminals where the terminal is located; and a receiving device configured to use, within a set of resources of a group common PDCCH corresponding to the group of terminals, a fixed subcarrier space or different subcarrier spaces to receive information of the group of terminals sent from a base station.

Optionally, the fixed subcarrier space is a subcarrier space used by the terminals during receiving of the set of resources of the common downlink control channel.

Optionally, the different subcarrier spaces include subcarrier spaces used by the terminals during sending and receiving of data in the same slot.

Optionally, the receiving device is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the receiving device is configured to:

for any slot, using, within a set of resources of a group common PDCCH corresponding to the slot, a subcarrier space corresponding to the slot to receive the information of the group of terminals sent from the base station on the group common PDCCH.

Optionally, a subcarrier space used for sending a group common PDCCH by terminals is informed by a base station through explicit signaling.

In a fifth aspect, one embodiment of the present disclosure further provides a base station for transmitting information, including:

a processor configured to send and receive data through a transceiver, read programs in a storage, and executing procedures as follows:

determining information of a group of terminals to be sent; and using, within a set of resources of a group common PDCCH corresponding to the group of terminals, a fixed subcarrier space or different subcarrier spaces to send the information of the group of terminals.

The transceiver configured to receive and send data under a control of the processor.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in the same slot.

Optionally, the using within the set of resources of the group common PDCCH corresponding to the group of terminals, different subcarrier spaces to send the information of the group of terminals includes:

for any subcarrier space in the slot, using within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the using within the set of resources of the group common PDCCH corresponding to the group of terminals, different subcarrier spaces to send the information of the group of terminals includes:

for any slot, using within a set of resources of a group common PDCCH corresponding to the slot, a subcarrier space corresponding to the slot to receive and send the information of the group of terminals on the group common PDCCH.

Optionally, the processor is configured to execute procedures to inform terminals of a subcarrier space used for sending a group common PDCCH through explicit signaling.

In a sixth aspect, one embodiment of the present disclosure further provides a terminal for transmitting information, including:

a processor configured to send and receive data through a transceiver, reading programs in a storage, and executing procedures as follows:

detecting a group common PDCCH corresponding to a group of terminals where the terminal is located; and using, within a set of resources of a group common PDCCH corresponding to the group of terminals, a fixed subcarrier space or different subcarrier spaces to receive information of the group of terminals sent from a base station.

The transceiver configured to receive and send data under a control of the processor.

Optionally, the fixed subcarrier space is a subcarrier space used by the terminals during receiving of the set of resources of the common downlink control channel.

Optionally, the different subcarrier spaces are subcarrier spaces used by the terminals during sending and receiving of data in the same slot.

Optionally, the using within the set of resources of the group common PDCCH corresponding to the group of terminals, different subcarrier spaces to receive the information of the group of terminals sent from the base station includes:

for any subcarrier space in the slot, using within a set of resources of a group common PDCCH corresponding to the subcarrier space, the subcarrier space to receive the information of the group of terminals on the group common PDCCH.

Optionally, the different subcarrier spaces include subcarrier spaces corresponding to each slot.

Optionally, the using within the set of resources of the group common PDCCH corresponding to the group of terminals, different subcarrier spaces to receive the information of the group of terminals sent from the base station includes:

for any slot, using within a set of resources of a group common PDCCH corresponding to the slot, a subcarrier space corresponding to the slot to receive the information of the group of terminals sent from the base station on the group common PDCCH.

Optionally, a subcarrier space used for sending a group common PDCCH by terminals is informed by a base station through explicit signaling.

In solutions provided by the embodiments of the present disclosure, when a base station needs to send information related with a group of terminals by using different subcarrier spaces, the base station sends the information of the group of terminals required to be sent to a group of terminals to terminals of the group of terminals by using a fixed subcarrier space or different subcarrier spaces on a group common PDCCH; and correspondingly, the terminals of the group of terminals can also receive the information of the group of terminals sent from the base station by using the fixed subcarrier space or different subcarrier spaces on the group common PDCCH. Consequently, when the base station needs to send the information related with a group of terminals by using different subcarrier spaces, the base station can flexibly send the information of the group of terminals to the terminals, and thus, the system performance is further improved.

BRIEF DESCRIPTION OF THE DRAWINGS

In order to more clearly describe technical solutions of embodiments of the present disclosure, drawings required to be used in descriptions of the embodiments will be briefly introduced below. Obviously, the drawings described below are only some embodiments of the present disclosure, and other drawings can be obtained according to these drawings by those having ordinary skill in the art on the premise of not making inventive labor.

DETAILED DESCRIPTION OF THE EMBODIMENTS

In order to make objects, technical solutions and advantages of the present disclosure clearer, the present disclosure is further described in details below with reference to drawings. Apparently, embodiments described are only part of embodiments of the present disclosure, rather than all embodiments. All other embodiments achieved by those having ordinary skill in the art on the premise of not making inventive labor on the basis of the embodiments of the present disclosure all fall within the protection scope of the present disclosure.

Figure 1:
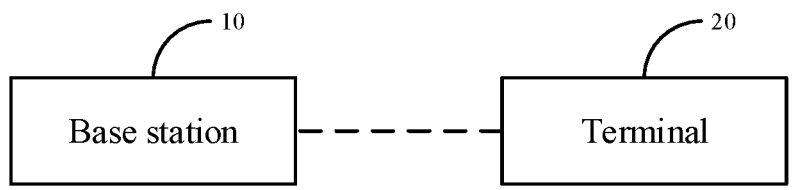
FIG. 1 is a structural schematic diagram of a system for transmitting information of one embodiment of the present disclosure.

Referring to FIG. 1, a system for transmitting information provided by one embodiment of the present disclosure includes a base station 10 and a terminal 20.

The base station 10 is configured to determine information of a group of terminals to be sent; and the base station 10 uses, within a set of resources of a group common PDCCH corresponding to the group of terminals, a fixed subcarrier space or different subcarrier spaces to send the information of the group of terminals.

The terminal 20 is configured to detect a group common PDCCH corresponding to the group of terminals where the terminal is located; and the terminal uses, within a set of resources of a group common PDCCH corresponding to the group of terminals, a fixed subcarrier space or different subcarrier spaces to receive the information of the group of terminals sent from the base station.

When the base station needs to send information related with a group of terminals by using different subcarrier spaces, the base station in the embodiment of the present disclosure sends the information of the group of terminals required to be sent to a group of terminals to terminals of the group of terminals by using a fixed subcarrier space or different subcarrier spaces on a group common PDCCH; and correspondingly, the terminals of the group of terminals can also receive the information of the group of terminals sent from the base station by using the fixed subcarrier space or different subcarrier spaces on the group common PDCCH. Consequently, when the base station needs to send the information related with a group of terminals by using different subcarrier spaces, the base station can flexibly send the information of the group of terminals to the terminals, and thus, the system performance is further improved.

In which, SCS (subcarrier space) information (or called numerology information) is obtained through informing a terminal by the base station or in an implicit manner.

The group of terminals in the embodiment of the present disclosure includes at least one terminal; and the base station needs to send the information of the group of terminals to terminals of the group of terminals on a group common PDCCH corresponding to the group of terminals, wherein the information of the group of terminals is common related information for all the terminals in the group of terminals, and specific information included in the information of the group of terminals is not defined in the embodiment of the present disclosure.

In some embodiments of the present disclosure, the terminals may also be called UE. The UE may be static or moving. The UE may also be called a mobile station, a subscriber unit, a station, etc. The UE may be a cellular phone, a personal digital assistant (PDA), a radio modem, a wireless communication device, a hand-hold device, a laptop computer, a cordless telephone, a wireless local loop (WLL) station, a tablet personal computer, etc. The UE can communicate with network side devices such as macro eNB, micro-micro eNB, femto eNB and a relay station.

Optionally, a base station side and a terminal side need to transmit and receive the information of the group of terminals by using the same subcarrier space when the information of the group of terminals is transmitted on a group common PDCCH; and a base station informs the terminals of a mode for sending the information of the group of terminals used by the base station to enable the terminals to receive the information of the group of terminals by using the mode the same as that of the base station.

For example, if the base station uses, within a set of resources of a group common PDCCH corresponding to a group of terminals, a fixed subcarrier space to send the information of the group of terminals, the base station informs the terminals of an used transmission mode to enable the terminals to use, within the set of resources of the group common PDCCH corresponding to the group of terminals, the fixed subcarrier space to receive the information of the group of terminals sent from the base station.

If the base station uses, within a set of resources of a group common PDCCH corresponding to a group of terminals, different subcarrier spaces to send the information of the group of terminals, the base station informs the terminals of an used transmission mode to enable the terminals to use, within the set of resources of the group common PDCCH corresponding to the group of terminals, the different subcarrier spaces to receive the information of the group of terminals sent from the base station.

It is necessary to note that the above-mentioned mode that the base station informs the terminals of a subcarrier space used during data receiving in an explicit manner is only illustrated in the embodiments of the present disclosure, and the subcarrier space used during the data receiving of the terminals can be further determined in a predefined manner. The modes configured to determine the subcarrier space used during the data receiving of the terminals to be protected by the embodiments of the present disclosure are not limited to the above-mentioned examples, and any mode capable of determining the subcarrier space used during the data receiving of the terminals is applicable to the present disclosure.

Sending information related with a group of terminals by using different subcarrier spaces configured by a base station of the embodiments of the present disclosure includes, but not limited to, the following two cases:

1. Different subcarrier spaces exist in configured slots of the base station;

2. Different subcarrier spaces exist among the configured slots of the base station.

The above two cases are separately described below.

Case 1: Different subcarrier spaces exist in the configured slots of the base station.

The base station uses, within a set of resources of a group common PDCCH corresponding to a group of terminals, a fixed subcarrier space or different subcarrier spaces to send information of the group of terminals.

When the different subcarrier spaces exist in the configured slots of the base station, resources using the different subcarrier spaces are orthogonal in a frequency domain.

I: the base station uses, within a set of resources of a group common PDCCH corresponding to a group of terminals, a fixed subcarrier space to send the information of the group of terminals;

correspondingly, the terminals use, within the set of resources of the group common PDCCH corresponding to the group of terminals, the fixed subcarrier space to receive the information of the group of terminals sent from the base station.

Optionally, after the base station determines to use, within a set of resources of a group common PDCCH corresponding to a group of terminals, a fixed subcarrier space to send the information of the group of terminals, the terminals also use, within the set of resources of the group common PDCCH corresponding to the group of terminals, the fixed subcarrier space to receive the information of the group of terminals sent from the base station after the terminals receive a notification from the base station.

Optionally, the fixed subcarrier space is a subcarrier space used by the base station during sending of the set of resources of the common downlink control channel.

For example, two kinds of different subcarrier spaces exist in the configured slots of the base station, i.e., 15 kHz and 30 kHz; and the subcarrier space used by the base station during sending of the set of resources of the common downlink control channel is 15 kHz, the base station always uses, within a set of resources of a group common PDCCH corresponding to a group of terminals, the subcarrier space of 15 kHz to send the information of the group of terminals;

correspondingly, configured terminals of the base station send and receive data according to the two kinds of subcarrier spaces, i.e., 15 kHz and 30 kHz; and a subcarrier space used by the terminals during receiving of the set of resources of the common downlink control channel is 15 kHz, the terminals always use, within a set of resources of a group common PDCCH corresponding to a group of terminals, the subcarrier space of 15 kHz to receive the information of the group of terminals sent from the base station.

It is necessary to note that taking a subcarrier space used by the base station during sending of the set of resources of the common downlink control channel as a fixed subcarrier space is only one implementation mode of the embodiments of the present disclosure, and the fixed subcarrier space to be protected by the embodiments of the present disclosure is not limited to the subcarrier space used by the base station during sending of the set of resources of the common downlink control channel; for example, the embodiments of the present disclosure can take a preset value as the fixed subcarrier space.

For example, two kinds of different subcarrier spaces exist in the configured slots of the base station, i.e., 15 kHz and 30 kHz; and the subcarrier space used by the base station during sending of the set of resources of the common downlink control channel is 15 kHz, a preset fixed subcarrier space of the base station is 30 kHz, the base station always uses, within a set of resources of a group common PDCCH corresponding to a group of terminals, the subcarrier space of 30 kHz to send the information of the group of terminals;

correspondingly, configured terminals of the base station send and receive data according to the two kinds of subcarrier spaces, i.e., 15 kHz and 30 kHz; and a subcarrier space used by the terminals during receiving of the set of resources of the common downlink control channel is 15 kHz, a preset fixed subcarrier space of the base station is 30 kHz, the terminals always use, within a set of resources of a group common PDCCH corresponding to a group of terminals, the subcarrier space of 30 kHz to receive the information of the group of terminals sent from the base station.

II: the base station uses, within different sets of resources of a group common PDCCH corresponding to a group of terminals, different subcarrier spaces to send the information of the group of terminals:

correspondingly, the terminals use, within the different sets of resources of the group common PDCCH corresponding to the group of terminals, the different subcarrier spaces to receive the information of the group of terminals sent from the base station.

Optionally, after the base station determines to use, within different sets of resources of a group common PDCCH corresponding to a group of terminals, different subcarrier spaces to send the information of the group of terminals, the terminals also use, within the different sets of resources of the group common PDCCH corresponding to the group of terminals, the different subcarrier spaces to receive the information of the group of terminals sent from the base station after the terminals receive a notification from the base station.

Optionally, the different subcarrier spaces include subcarrier spaces used by terminals of the group of terminals during sending and receiving of data in the same slot.

Figure 2:
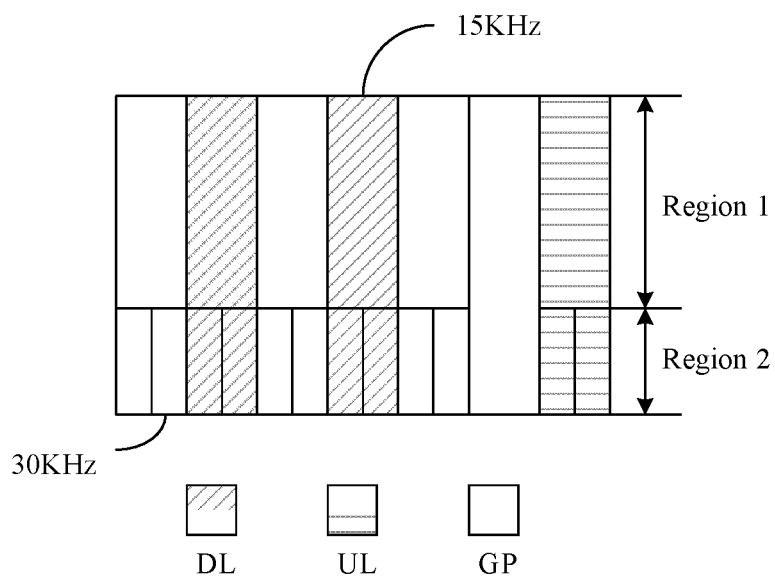
FIG. 2 is a schematic diagram of subcarrier spaces in the same slot of one embodiment of the present disclosure.

Subcarrier spaces used by terminals in a group of terminals during sending and receiving of data in the same slot are shown in FIG. 2, wherein a subcarrier space corresponding to a first resource region in the slot is 15 kHz, and a subcarrier space corresponding to a second resource region in the slot is 30 kHz.

Then, when the base station sends the information of the group of terminals to the terminals on a group common PDCCH corresponding to the group of terminals, different subcarrier spaces used within a set of resources of the group common PDCCH corresponding to the group of terminals are 15 kHz and 30 kHz;

correspondingly, when the terminals receive the information of the group of terminals sent from the base station on a group common PDCCH corresponding to the group of terminals, different subcarrier spaces used within a set of resources of the group common PDCCH corresponding to the group of terminals are 15 kHz and 30 kHz.

Optionally, when different subcarrier spaces include subcarrier spaces used by terminals during sending and receiving of data in the same slot, the base station sends the information of the group of terminals by using the different subcarrier spaces in a manner as follows.

For any subcarrier space in the slot, the base station uses, within a set of resources of a group common PDCCH corresponding to the subcarrier space, the subcarrier space to send the information of the group of terminals on the group common PDCCH.

Subcarrier spaces used by terminals in a group of terminals during sending and receiving of data in the same slot are shown in FIG. 2, wherein a subcarrier space corresponding to a first resource region in the slot is 15 kHz, and a subcarrier space corresponding to a second resource region in the slot is 30 kHz.

Then, when a base station sends information of a group of terminals to the terminals on a group common PDCCH corresponding to the group of terminals, the base station uses, within a set of resources of a group common PDCCH corresponding to a first resource region, a subcarrier space of 15 kHz to send the information of the group of terminals and uses, within a set of resources of a group common PDCCH corresponding to a second resource region, a subcarrier space of 30 kHz to send the information of the group of terminals.

Optionally, when different subcarrier spaces include subcarrier spaces used by terminals during sending and receiving of data in the same slot, the terminals receive the information of the group of terminals by using the different subcarrier spaces in a manner as follows:

for any subcarrier space in the slot, the terminal uses, within a set of resources of a group common PDCCH corresponding to the subcarrier space, the subcarrier space to send the information of the group of terminals on the group common PDCCH.

Subcarrier spaces used by terminals in a group of terminals during sending and receiving of data in the same slot are shown in FIG. 2, wherein a subcarrier space corresponding to a first resource region in the slot is 15 kHz, and a subcarrier space corresponding to a second resource region in the slot is 30 kHz.

Then, terminals receive a group common PDCCH corresponding to a group of terminals, and the terminals use, within a set of resources of a group common PDCCH corresponding to a first resource region, a subcarrier space of 15 kHz to receive the information of the group of terminals and use, within a set of resources of a group common PDCCH corresponding to a second resource region, a subcarrier space of 30 kHz to receive the information of the group of terminals.

Case 2: Different subcarrier spaces exist among the configured slots of the base station.

The base station uses, within a set of resources of a group common PDCCH corresponding to a group of terminals, a fixed subcarrier space or different subcarrier spaces to send information of the group of terminals.

When the different subcarrier spaces exist among the configured slots of the base station, resources using different subcarrier spaces are orthogonal in a time domain.

I: the base station uses, within a set of resources of a group common PDCCH corresponding to a group of terminals, a fixed subcarrier space to send the information of the group of terminals;

correspondingly, the terminals use, within the set of resources of the group common PDCCH corresponding to the group of terminals, the fixed subcarrier space to receive the information of the group of terminals sent from the base station.

Optionally, after the base station determines to use, within a set of resources of a group common PDCCH corresponding to a group of terminals, a fixed subcarrier space to send the information of the group of terminals, the terminals also use, within the set of resources of the group common PDCCH corresponding to the group of terminals, the fixed subcarrier space to receive the information of the group of terminals sent from the base station after the terminals receive a notification from the base station.

Optionally, the fixed subcarrier space is a subcarrier space used by the base station during sending of the set of resources of the common downlink control channel.

For example, two kinds of different subcarrier spaces exist among the configured slots of the base station, supposed that a subcarrier space of a slot N is 15 kHz and a subcarrier space of a slot N+1 is 30 kHz; and the subcarrier space used by the base station during sending of the set of resources of the common downlink control channel is 15 kHz, the base station always uses, within a set of resources of a group common PDCCH corresponding to a group of terminals, the subcarrier space of 15 kHz to send the information of the group of terminals, namely, the base station uses, within both a set of resources of a group common PDCCH corresponding to the slot N and a set of resources of a group common PDCCH corresponding to the slot N+1, a subcarrier space of 15 kHz to send the information of the group of terminals;

correspondingly, two kinds of different subcarrier spaces exist among the configured slots of the base station, supposed that a subcarrier space of a slot N is 15 kHz and a subcarrier space of a slot N+1 is 30 kHz; and the subcarrier space used by the terminals during receiving of the set of resources of the common downlink control channel is 15 kHz, the terminals always use, within a set of resources of a group common PDCCH corresponding to a group of terminals, the subcarrier space of 15 kHz to receive the information of the group of terminals sent from the base station, namely, the terminals use, within both a set of resources of a group common PDCCH corresponding to the slot N and a set of resources of a group common PDCCH corresponding to the slot N+1, a subcarrier space of 15 kHz to receive the information of the group of terminals.

It is necessary to note that taking a subcarrier space used by the base station during sending of the set of resources of the common downlink control channel as a fixed subcarrier space is only one implementation mode of the embodiments of the present disclosure, and the fixed subcarrier space to be protected by the embodiments of the present disclosure is not limited to the subcarrier space used by the base station during sending of the set of resources of the common downlink control channel; for example, the embodiments of the present disclosure can take a preset value as the fixed subcarrier space.

For example two kinds of different subcarrier spaces exist among the configured slots of the base station, supposed that a subcarrier space of a slot N is 15 kHz and a subcarrier space of a slot N+1 is 30 kHz; and the subcarrier space used by the base station during sending of the set of resources of the common downlink control channel is 15 kHz, a preset fixed subcarrier space of the base station is 30 kHz, the base station always uses, within a set of resources of a group common PDCCH corresponding to a group of terminals, the subcarrier space of 30 kHz to send the information of the group of terminals, namely, the base station uses, within both a set of resources of a group common PDCCH corresponding to the slot N and a set of resources of a group common PDCCH corresponding to the slot N+1, a subcarrier space of 30 kHz to send the information of the group of terminals;

Correspondingly, configured terminals of the base station send and receive data according to the two kinds of subcarrier spaces, supposed that a subcarrier space of a slot N is 15 kHz and a subcarrier space of a slot N+1 is 30 kHz; and a subcarrier space used by the terminals during receiving of the set of resources of the common downlink control channel is 15 kHz, a preset fixed subcarrier space of the base station is 30 kHz, the terminals always use, within a set of resources of a group common PDCCH corresponding to a group of terminals, the subcarrier space of 30 kHz to receive the information of the group of terminals sent from the base station, namely, the terminals use, within both a set of resources of a group common PDCCH corresponding to the slot N and a set of resources of a group common PDCCH corresponding to the slot N+1, a subcarrier space of 30 kHz to receive the information of the group of terminals.

II: the base station uses, within different sets of resources of a group common PDCCH corresponding to a group of terminals, different subcarrier spaces to send the information of the group of terminals:

correspondingly, the terminals use, within the different sets of resources of the group common PDCCH corresponding to the group of terminals, the different subcarrier spaces to receive the information of the group of terminals sent from the base station.

Optionally, the base station determines to use, within different sets of resources of a group common PDCCH corresponding to a group of terminals, different subcarrier spaces to send the information of the group of terminals on the group common PDCCH; and the terminals use, within the different sets of resources of the group common PDCCH corresponding to the group of terminals, the different subcarrier spaces to receive the information of the group of terminals sent from the base station on the group common PDCCH.

Optionally, the different subcarrier spaces include subcarrier spaces corresponding to each slot.

Figure 3:
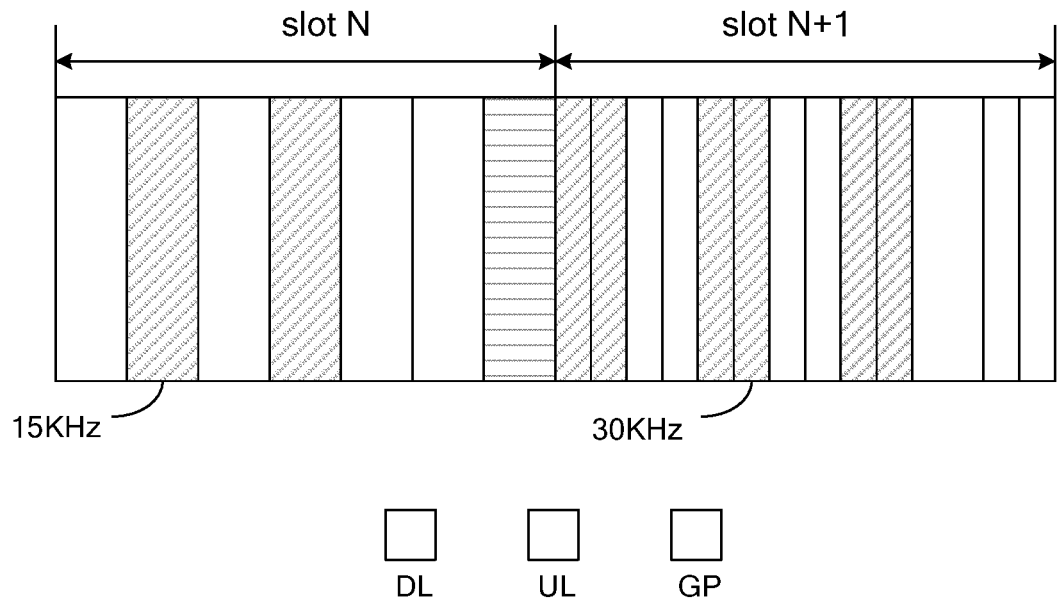
FIG. 3 is a schematic diagram of subcarrier spaces in different slots of one embodiment of the present disclosure.

Subcarrier spaces of different slots configured by a base station are shown in FIG. 3, wherein a subcarrier space used in a slot N is 15 kHz, and a subcarrier space used in a slot N+1 is 30 kHz.

Then, when the base station sends the information of the group of terminals to the terminals on a group common PDCCH corresponding to the group of terminals, different subcarrier spaces used within a set of resources of the group common PDCCH corresponding to the group of terminals are 15 kHz and 30 kHz;

correspondingly, when the terminals receive the information of the group of terminals sent from the base station on a group common PDCCH corresponding to the group of terminals, different subcarrier spaces used within a set of resources of the group common PDCCH corresponding to the group of terminals are 15 kHz and 30 kHz.

Optionally, when different subcarrier spaces include subcarrier spaces corresponding to each slot, the base station sends the information of the group of terminals by using the different subcarrier spaces in a manner as follows:

for any slot, the base station uses, within a set of resources of a group common PDCCH corresponding to the slot, a subcarrier space corresponding to the slot to send the information of the group of terminals on the group common PDCCH.

Subcarrier spaces of different slots configured by a base station are shown in FIG. 3, wherein a subcarrier space used in a slot N is 15 kHz, and a subcarrier space used in a slot N+1 is 30 kHz.

Then, when a base station sends information of a group of terminals to the terminals on a group common PDCCH corresponding to the group of terminals, the base station uses, within a set of resources of a group common PDCCH corresponding to a slot N, a subcarrier space of 15 kHz to send the information of the group of terminals and uses, within a set of resources of a group common PDCCH corresponding to a slot N+1, a subcarrier space of 30 kHz to send the information of the group of terminals.

Optionally, when different subcarrier spaces include subcarrier spaces corresponding to each slot, the terminals receive the information of the group of terminals by using the different subcarrier spaces in a manner as follows:

for any slot, the terminal uses, within a set of resources of a group common PDCCH corresponding to the slot, a subcarrier space corresponding to the slot to receive the information of the group of terminals sent from the base station on the group common PDCCH.

Subcarrier spaces of different slots configured by a base station are shown in FIG. 3, wherein a subcarrier space used in a slot N is 15 kHz, and a subcarrier space used in a slot N+1 is 30 kHz.

Then, when the terminals receive information of a group of terminals sent from a base station on a group common PDCCH corresponding to the group of terminals, the terminals use, within a set of resources of a group common PDCCH corresponding to a slot N, a subcarrier space of 15 kHz to send the information of the group of terminals and uses, within a set of resources of a group common PDCCH corresponding to a slot N+1, a subcarrier space of 30 kHz to send the information of the group of terminals.

A method for transmitting information is described by several embodiments below.

Figure 4:
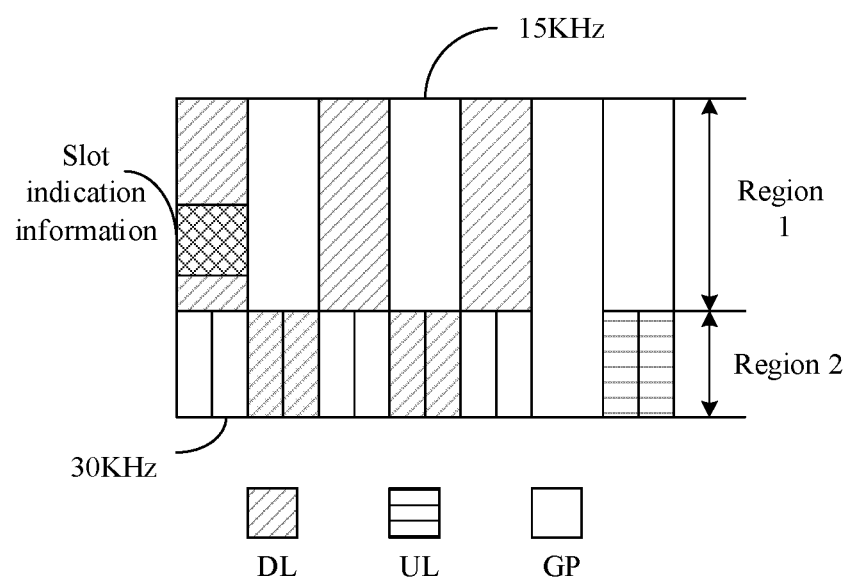
FIG. 4 is a schematic diagram of a method for transmitting information of a first system for transmitting information of one embodiment of the present disclosure.

Embodiment 1 supposed that a configured terminal UE1 of a base station needs to send/receive data according to different subcarrier spaces at different frequency domain positions. For example, the UE1 needs to send and receive data according to a subcarrier space of 15 kHz in a region (resource region) 1, and the UE1 needs to send and receive the data according to a subcarrier space of 30 kHz in a region 2, wherein the region 1 and the region 2 are orthogonal in a frequency domain. Simultaneously, the UE1 needs to detect and receive data of a common downlink control channel within a set of resources of the common downlink control channel according to a subcarrier frequency of 15 kHz. Then, the base station always transmits, within a set of resources of a group common PDCCH, data of the group common PDCCH according to a subcarrier space used for transmission of a common downlink control channel, namely sends the data of the group common PDCCH according to the subcarrier space of 15 kHz. The terminal only needs to detect and receive the data of the group common PDCCH within the set of resources of the group common PDCCH for transmission according to the subcarrier space of 15 kHz. The group common PDCCH at least includes structural information of slots. A schematic diagram of the embodiment 1 is shown in FIG. 4.

Figure 5:
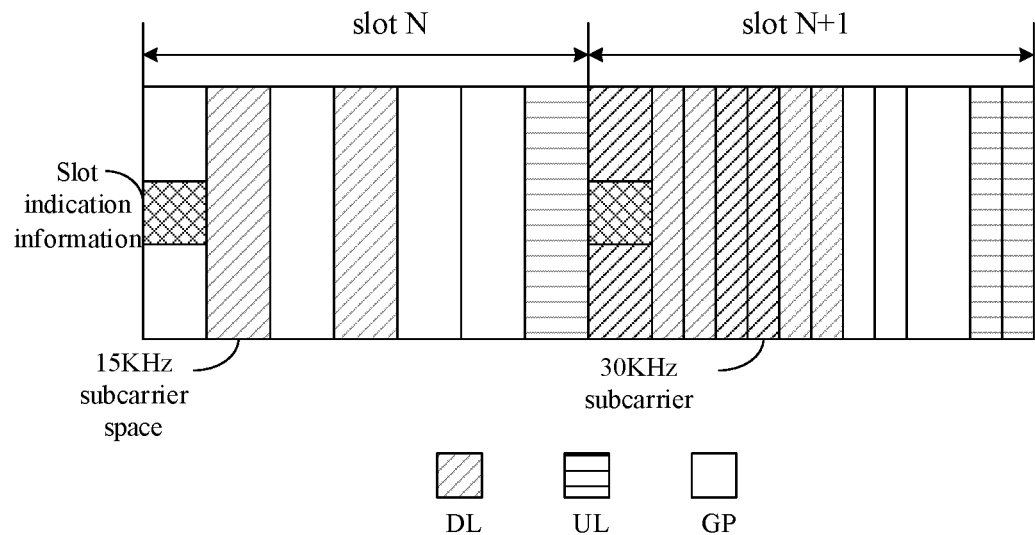
FIG. 5 is a schematic diagram of a method for transmitting information of a second system for transmitting information of one embodiment of the present disclosure.

Embodiment 2 supposed that a configured terminal UE1 of a base station needs to send/receive data according to different subcarrier spaces at different time domain positions. For example, the UE1 needs to send and receive data according to a subcarrier space of 15 kHz in a region 1, and the UE1 needs to send and receive the data according to a subcarrier space of 30 kHz in a region 2, wherein the region 1 and the region 2 are orthogonal in a time domain. Simultaneously, the UE1 needs to detect and receive data of a common downlink control channel within a set of resources of the common downlink control channel according to a subcarrier frequency of 15 kHz. Then, the base station always transmits, within a set of resources of a group common PDCCH, data of the group common PDCCH according to a subcarrier space used for transmission of a common downlink control channel, namely sends the data of the group common PDCCH according to the subcarrier space of 15 kHz. The terminal only needs to detect and receive the data of the group common PDCCH within the set of resources of the group common PDCCH for transmission according to the subcarrier space of 15 kHz. The group common PDCCH at least includes structural information of slots. A schematic diagram of the embodiment 2 is shown in FIG. 5.

Figure 6:
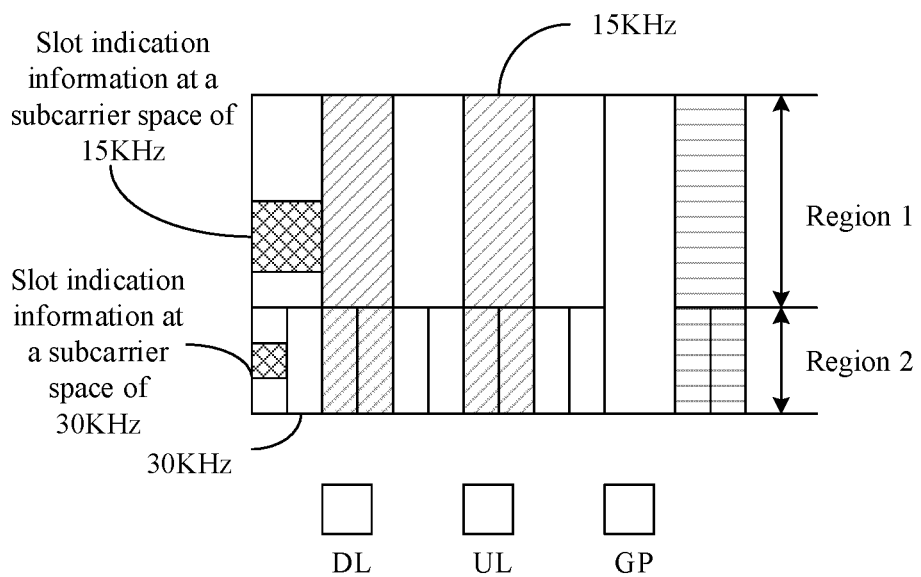
FIG. 6 is a schematic diagram of a method for transmitting information of a third system for transmitting information of one embodiment of the present disclosure.

Embodiment 3 supposed that a configured terminal UE1 of a base station needs to send/receive data according to different subcarrier spaces at different frequency domain positions. For example, the UE1 needs to send and receive data according to a subcarrier space of 15 kHz in a region 1, and the UE1 needs to send and receive the data according to a subcarrier space of 30 kHz in a region 2, wherein the region 1 and the region 2 are orthogonal in a frequency domain. The base station sends data of a group common PDCCH according to different subcarrier spaces in resources using the different subcarrier spaces. For example, the base station sends the data of the group common PDCCH according to a subcarrier space of 15 kHz in the region 1 and sends the data of the group common PDCCH according to a subcarrier space of 30 kHz in the region 2. The terminal is configured to detect and receiving the data of the group common PDCCH according to a corresponding subcarrier space on a set of resources of a group common PDCCH for transmission within resources corresponding to different subcarrier spaces according to information of the configured different subcarrier spaces and. For example, the UE1 is configured to detect and receiving, within a set of resources of a group common PDCCH for transmission, the data of the group common PDCCH according to a subcarrier space of 15 kHz in the region 1 and detecting and receiving, within the set of resources of the group common PDCCH for transmission, the data of the group common PDCCH according to a subcarrier space of 30 kHz in the region 2. A schematic diagram of the embodiment 3 is shown in FIG. 6.

Figure 7:
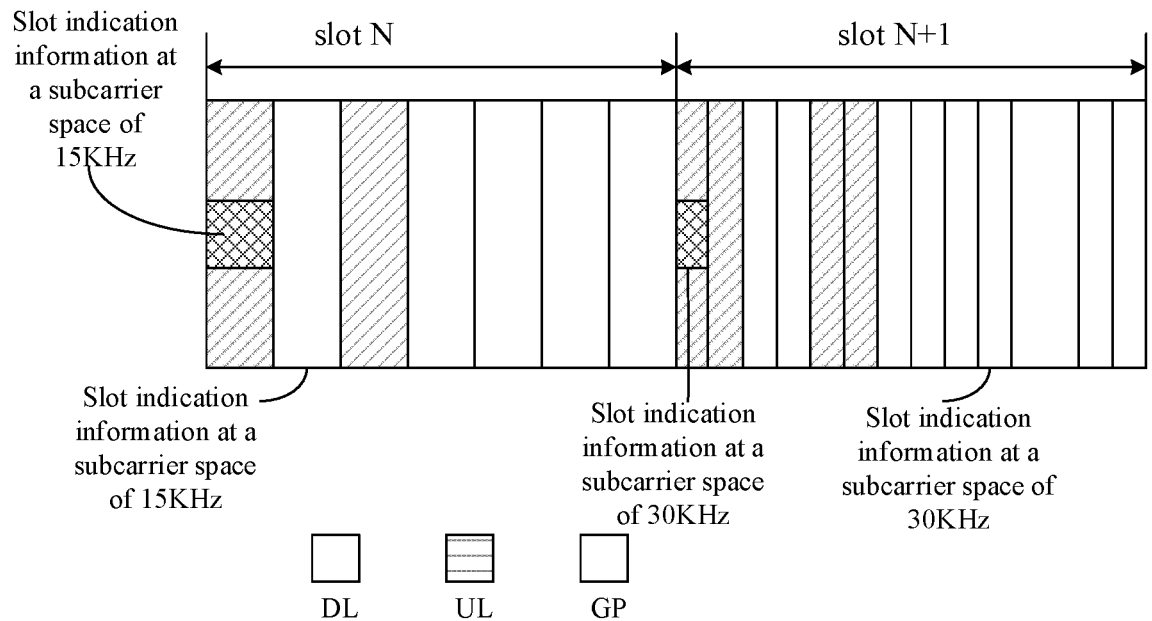
FIG. 7 is a schematic diagram of a method for transmitting information of a fourth system for transmitting information of one embodiment of the present disclosure.

Embodiment 4 supposed that a configured terminal UE1 of a base station needs to send/receive data according to different subcarrier spaces at different time domain positions. For example, the UE1 needs to send/receive data according to a subcarrier space of 15 kHz in a region 1, and the UE1 needs to send and receive the data according to a subcarrier space of 30 kHz in a region 2. In which, the region 1 and the region 2 are orthogonal in a time domain. The base station sends data of a group common PDCCH according to different subcarrier spaces in slots using the different subcarrier spaces. For example, a subcarrier space of 15 kHz is used in a slot1, and a subcarrier space of 30 kHz is used in a slot2. Then, the base station sends, within a set of resources of a group common PDCCH, the data of the group common PDCCH according to a subcarrier space of 15 kHz in the slot1 and sends, within a set of resources of a group common PDCCH for transmission, the data of the group common PDCCH according to a subcarrier space of 30 kHz in the slot2. The terminal detects and receives, within a set of resources of a group common PDCCH for transmission, the data of the group common PDCCH according to a corresponding subcarrier space according to subcarrier spaces used by slots in the slots using the different subcarrier spaces. For example, the UE1 is configured to detect and receiving, within a set of resources of a group common PDCCH for transmission, the data of the group common PDCCH according to a subcarrier space of 15 kHz in the slot1 and detecting and receiving, within the set of resources of the group common PDCCH for transmission, the data of the group common PDCCH according to a subcarrier space of 30 kHz in the slot2. A schematic diagram of the embodiment 4 is shown in FIG. 7.

It is necessary to note that in the embodiments of the present disclosure, when a method for transmitting information is described, only subcarrier spaces, i.e., 15 kHz and 30 kHz are illustrated, however, the subcarrier spaces of the embodiments of the present disclosure are not limited to 15 kHz and 30 kHz, for example 60 kHz and 120 kHz are also applicable to the present disclosure, and no further description is needed in details.

In addition, in the embodiments of the present disclosure, when a method for transmitting information is described, only two different subcarrier spaces are illustrated when conditions that different subcarrier spaces exist in slots and the different subcarrier spaces exist among the slots are described, however, not only two different subcarrier spaces exist in or among the slots, for example the number of the different subcarrier spaces may be 3 or 4, and no further description is needed in details.

Based on the same inventive concept, the embodiments of the present disclosure further provide a first base station for transmitting information; and a principle for problem solving of the first base station for transmitting information is similar to that of a system for transmitting information of the embodiments of the present disclosure, therefore, implementations of the base station may refer to those of the system, and no further description is needed in details.

Figure 8:
FIG. 8 is a structural schematic diagram of a first base station for transmitting information of one embodiment of the present disclosure.

Referring to FIG. 8, a first base station for transmitting information of the embodiments of the present disclosure includes:

a determining device 801 configured to determine information of a group of terminals to be sent; and a sending device 802 configured to use, within a set of resources of a group common PDCCH corresponding to the group of terminals, a fixed subcarrier space or different subcarrier spaces to send the information of the group of terminals.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in the same slot.

Optionally, the sending device 802 is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the sending device 802 is configured to:

for any slot, use, within a set of resources of a group common PDCCH corresponding to the slot, a subcarrier space corresponding to the slot to send the information of the group of terminals on the group common PDCCH.

Based on the same inventive concept, the embodiments of the present disclosure further provide a first terminal for transmitting information; and a principle for problem solving of the first terminal for transmitting information is similar to that of a system for transmitting information of the embodiments of the present disclosure, therefore, implementations of the base station may refer to those of the system, and no further description is needed in details.

Figure 9:
FIG. 9 is a structural schematic diagram of a first terminal for transmitting information of one embodiment of the present disclosure.

Referring to FIG. 9, a first terminal for transmitting information of the embodiments of the present disclosure includes:

a detecting device 901 configured to detect a group common PDCCH corresponding to a group of terminals where the terminal is located; and a receiving device 902 configured to use, within a set of resources of a group common PDCCH corresponding to the group of terminals, a fixed subcarrier space or different subcarrier spaces to receive information of the group of terminals sent from a base station.

Optionally, the fixed subcarrier space is a subcarrier space used by the terminals during receiving of the set of resources of the common downlink control channel.

Optionally, the different subcarrier spaces include subcarrier spaces used by the terminals during sending and receiving of data in the same slot.

Optionally, the receiving device 902 is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the receiving device 902 is configured to:

for any slot, use, within a set of resources of a group common PDCCH corresponding to the slot, a subcarrier space corresponding to the slot to receive the information of the group of terminals sent from the base station on the group common PDCCH.

Figure 10:
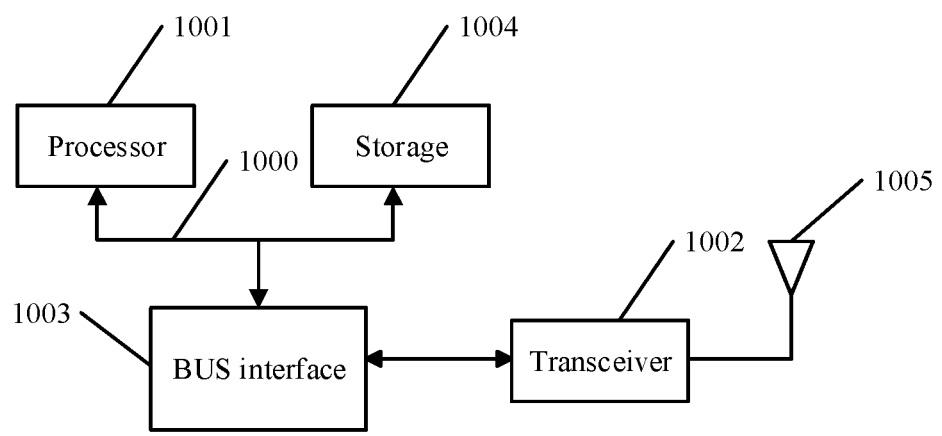
FIG. 10 is a structural schematic diagram of a second base station for transmitting information of one embodiment of the present disclosure.

Referring to FIG. 10, a second base station for transmitting information of the embodiments of the present disclosure includes:

a processor 1001 configured to send and receive data through a transceiver 1002, read programs in a storage 1004, and execute procedures as follows:

determining information of a group of terminals to be sent; and using, within a set of resources of a group common PDCCH corresponding to the group of terminals, a fixed subcarrier space or different subcarrier spaces to send the information of the group of terminals.

The transceiver 1002 configured to receive and send data under the control of the processor 1001.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in the same slot.

Optionally, the processor 1001 is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the processor 1001 is configured to:

for any slot, use, within a set of resources of a group common PDCCH corresponding to the slot, a subcarrier space corresponding to the slot to send the information of the group of terminals on the group common PDCCH.

The interaction between the processor 1001 and the terminals is performed through the transceiver 1002.

A bus framework (represented by a bus 1000) is shown in FIG. 10, the bus 1000 may include random quantities of interconnected buses and bridges, and various circuits including one or more processors represented by a processor 1001 and storages represented by a storage 1004 are linked together by the bus 1000. The condition that all kinds of other circuits such as peripheral equipment, voltage regulators and power management circuits can be also linked together by the bus 1000 is known in the field, so that no further description is needed in the text. A bus interface 1003 provides an interface between the bus 1000 and the transceiver 1002. The transceiver 1002 may be an element, may also be a plurality of elements, for instance a plurality of receivers and transmitters, and provides a unit for being in communication with other devices on a transmission medium. Data processed by the processor 1001 are transmitted on a wireless medium through an antenna 1005, and further, the antenna 1005 is further configured to receiving data and sending the data to the processor 1001.

The processor 1001 is responsible for managing the bus 1000 and general processing and can also provide various functions including timing, peripheral interface, voltage regulation, power supply management and other control functions. The storage 1004 can be configured to storing data used by the processor 1001 during operation executing.

Optionally, the processor 1001 may be a CPU (central processing unit), an ASIC (Application Specific Integrated Circuit), an FPGA (Field-Programmable Gate Array) or a CPLD (Complex Programmable Logic Device).

Figure 11:
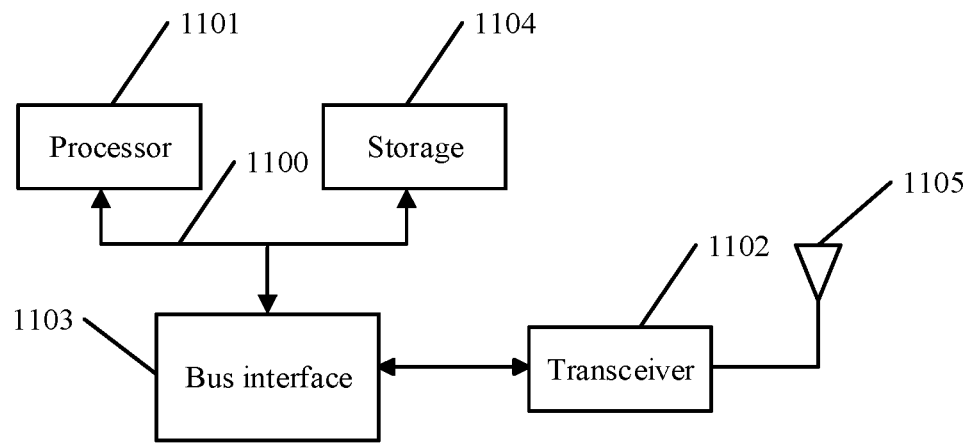
FIG. 11 is a structural schematic diagram of a second terminal for transmitting information of one embodiment of the present disclosure.

Referring to FIG. 11, a second terminal for transmitting information of the embodiments of the present disclosure includes:

a processor 1101 configured to send and receive data through a transceiver 1102, read programs in a storage 1104, and execute procedures as follows:

detecting a group common PDCCH corresponding to a group of terminals where the terminal is located; and using, within a set of resources of a group common PDCCH corresponding to the group of terminals, a fixed subcarrier space or different subcarrier spaces to receive information of the group of terminals sent from a base station.

The transceiver 1102 configured to receive and send data under the control of the processor 1101.

Optionally, the fixed subcarrier space is a subcarrier space used by the terminals during receiving of the set of resources of the common downlink control channel.

Optionally, the different subcarrier spaces include subcarrier spaces used by the terminals during sending and receiving of data in the same slot.

Optionally, the processor 1101 is configured to:

for any subcarrier space in the slot, use, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the processor 1101 is configured to:

for any slot, use, within a set of resources of a group common PDCCH corresponding to the slot, a subcarrier space corresponding to the slot to receive the information of the group of terminals sent from the base station on the group common PDCCH.

The interaction between the processor 1101 and the base station is performed through the transceiver 1102.

A bus framework (represented by a bus 1100) is shown in FIG. 11, the bus 1100 may include random quantities of interconnected buses and bridges, and various circuits including one or more processors represented by a processor 1101 and storages represented by a storage 1104 are linked together by the bus 1100. The condition that all kinds of other circuits such as peripheral equipment, voltage regulators and power management circuits can be also linked together by the bus 1100 is known in the field, so that no further description is needed in the text. A bus interface 1103 provides an interface between the bus 1100 and the transceiver 1102. The transceiver 1102 may be an element, may also be a plurality of elements, for instance a plurality of receivers and transmitters, and provides a unit for being in communication with other devices on a transmission medium. Data processed by the processor 1101 are transmitted on a wireless medium through an antenna 1105, and further, the antenna 1105 is further configured to receiving data and sending the data to the processor 1101.

The processor 1101 is responsible for managing the bus 1100 and general processing and can also provide various functions including timing, peripheral interface, voltage regulation, power supply management and other control functions. The storage 1104 can be configured to storing data used by the processor 1101 during operation executing.

Optionally, the processor 1101 may be a CPU, an ASIC, an FPGA or a CPLD.

Based on the same inventive concept, the embodiments of the present disclosure further provide a method for transmitting information; and equipment corresponding to the method is a base station for transmitting information of the embodiments of the present disclosure, a principle for problem solving of the method is similar to that of a system, therefore, implementations of the method may refer to those of the system, and no further description is needed in details.

Figure 12:
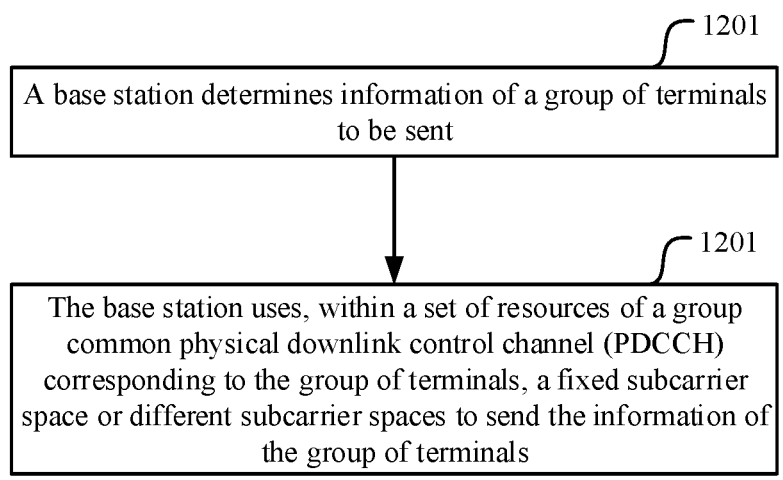
FIG. 12 is a flow chart of a base station assisted information transmitting method of one embodiment of the present disclosure.

Referring to FIG. 12, a method for transmitting information of the embodiments of the present disclosure includes:

step 1201: A base station determines information of a group of terminals to be sent; and step 1202: The base station uses, within a set of resources of a group common PDCCH corresponding to the group of terminals, a fixed subcarrier space or different subcarrier spaces to send the information of the group of terminals.

Optionally, the fixed subcarrier space is a subcarrier space used by the base station during sending of the set of resources of the common downlink control channel.

Optionally, the different subcarrier spaces include subcarrier spaces used by terminals of the group of terminals during sending and receiving of data in the same slot.

Optionally, the step that the base station uses, within the set of resources of the group common PDCCH corresponding to the group of terminals, different subcarrier spaces to send the information of the group of terminals includes:

for any subcarrier space in the slot, the base station uses, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the step that the base station uses, within the set of resources of the group common PDCCH corresponding to the group of terminals, different subcarrier spaces to send the information of the group of terminals includes:

for any slot, the base station uses, within a set of resources of a group common PDCCH corresponding to the slot, a subcarrier space corresponding to the slot to send the information of the group of terminals on the group common PDCCH.

Based on the same inventive concept, the embodiments of the present disclosure further provide a method for transmitting information; and equipment corresponding to the method is a terminal for transmitting information of the embodiments of the present disclosure, a principle for problem solving of the method is similar to that of a system, therefore, implementations of the method may refer to those of the system, and no further description is needed in details.

Figure 13:
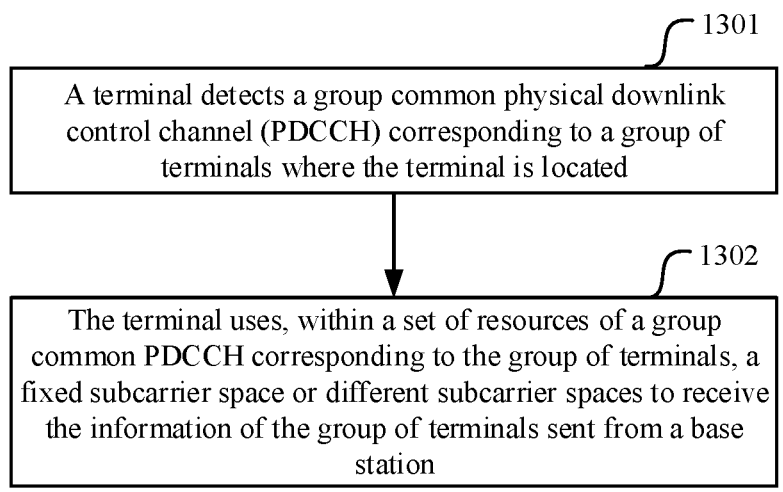
FIG. 13 is a flow chart of a terminal assisted information transmitting method of one embodiment of the present disclosure.

Referring to FIG. 13, a method for transmitting information of the embodiments of the present disclosure includes:

step 1301: A terminal detects a group common PDCCH corresponding to a group of terminals where the terminal is located; and step 1302: The terminal uses, within a set of resources of a group common PDCCH corresponding to the group of terminals, a fixed subcarrier space or different subcarrier spaces to receive information of the group of terminals sent from a base station.

Optionally, the fixed subcarrier space is a subcarrier space used by the base station during sending of the set of resources of the common downlink control channel.

Optionally, the different subcarrier spaces include subcarrier spaces used by the terminals during sending and receiving of data in the same slot.

Optionally, the step that the terminal uses, within the set of resources of the group common PDCCH corresponding to the group of terminals, different subcarrier spaces to receive the information of the group of terminals sent from the base station includes:

for any subcarrier space in the slot, the terminal uses, within a set of resources of a group common PDCCH corresponding to the subcarrier space, the subcarrier space to send the information of the group of terminals on the group common PDCCH.

Optionally, the different subcarrier spaces include subcarrier spaces corresponding to each slot.

Optionally, the step that the terminal uses, within the set of resources of the group common PDCCH corresponding to the group of terminals, different subcarrier spaces to receive the information of the group of terminals sent from the base station includes:

for any slot, the terminal uses, within a set of resources of a group common PDCCH corresponding to the slot, a subcarrier space corresponding to the slot to receive the information of the group of terminals sent from the base station on the group common PDCCH.

The present application is described referring to methods, devices (systems) and/or block diagrams and/or flow charts of computer programmed products according to embodiments of the present application shown above. It should be understood that a block of a pictorial view of the block diagram and/or flow chart and combination of blocks of the pictorial view of the block diagram and/or flow chart can be achieved through computer programmed instructions. These computer programmed instructions can be supplied to a general-purpose computer, a processor of a special-purpose computer and/or other programmable data processing devices to generate a machine, so that instructions executed by the computer processor and/or the other programmable data processing devices create a method for achieving appointed functions/actions in blocks of a block diagram and/or a flow chart.

Correspondingly, the present application can also be implemented with hardware and/or software (including firmware, resident software, microcodes, etc.). Further, the present application may adopt a form of computer programmed products on computer usable or computer readable storage media, and the computer programmed products have computer usable or computer readable program codes achieved in the media and are used by an instruction execution system or in a manner of combining the instruction execution system. In the context of the present application, the computer usable or computer readable media may be any medium, may contain, store, communicate, transmit or convey programs, are used by instruction execution systems, devices or equipment or are used in a manner of combining the instruction execution systems, devices or equipment.

Apparently, various changes and modifications can be made to the present disclosure by those skilled in the art without departing from the spirit and scope of the present disclosure. Thus, provided that these changes and modifications of the present disclosure belong to scopes of the claims of the present disclosure and equivalent technologies thereof, the present disclosure also intends to include these changes and modifications.

What is claimed is:

1. A method for transmitting information, comprising following steps:
   determining, by a base station information of a group of terminals to be sent; and
   using, by the base station, within a set of resources of a group common physical downlink control channel (PDCCH) corresponding to the group of terminals, different subcarrier spaces to send the information of the group of terminals;
   wherein the different subcarrier spaces comprise subcarrier spaces used by terminals of the group of terminals during sending and receiving of data in a same slot or, the different subcarrier spaces comprise subcarrier spaces corresponding to each slot;
   wherein in response to that the different subcarrier spaces comprise subcarrier spaces used by terminals of the group of terminals during sending and receiving of data in a same slot, the using, by the base station, within the set of resources of the group common PDCCH corresponding to the group of terminals, different subcarrier spaces to send the information of the group of terminals comprises:
for any subcarrier space in the slot, using, by the base station, within a set of resources of a group common PDCCH corresponding to the subcarrier space, the subcarrier space to send the information of the group of terminals on the group common PDCCH; or,
wherein in response to that the different subcarrier spaces comprise subcarrier spaces corresponding to each slot, the using, by the base station, within the set of resources of the group common PDCCH corresponding to the group of terminals, different subcarrier spaces to send the information of the group of terminals comprises:
for any slot, using, by the base station, within a set of resources of a group common PDCCH corresponding to the slot, a subcarrier space corresponding to the slot to receive and send the information of the group of terminals on the group common PDCCH.

2. The method according to claim 1, wherein the base station informs terminals of a subcarrier space used for sending a group common PDCCH through an explicit signaling.

3. A method for transmitting information, comprising following steps:
detecting, by a terminal a group common physical downlink control channel (PDCCH) corresponding to a group of terminals where the terminal is located; and
using, by the terminal, within a set of resources of a group common PDCCH corresponding to the group of terminals, different subcarrier spaces to receive information of the group of terminals sent from a base station;
wherein the different subcarrier spaces are subcarrier spaces used by the terminals during sending and receiving of data in a same slot or, the different subcarrier spaces comprise subcarrier spaces corresponding to each slot;
wherein in response to that the different subcarrier spaces are subcarrier spaces used by the terminals during sending and receiving of data in a same slot, the using, by the terminal, within the set of resources of the group common PDCCH corresponding to the group of terminals, different subcarrier spaces to receive the information of the group of terminals sent from the base station comprises:
for any subcarrier space in the slot, using, by the terminal, within a set of resources of a group common PDCCH corresponding to the subcarrier space, the subcarrier space to receive the information of the group of terminals on the group common PDCCH; or,
wherein in response to that the different subcarrier spaces comprise subcarrier spaces corresponding to each slot, the using, by the terminal, within the set of resources of the group common PDCCH corresponding to the group of terminals, different subcarrier spaces to receive the information of the group of terminals sent from the base station comprises:
for any slot, using, by the terminal, within a set of resources of a group common PDCCH corresponding to the slot, a subcarrier space corresponding to the slot to receive the information of the group of terminals sent from the base station on the group common PDCCH.

4. The method according to claim 3, wherein a subcarrier space used for sending a group common PDCCH by terminals is informed by a base station through an explicit signaling.

5. A base station, comprising:
a processor configured to send and receive data through a transceiver, read programs in a storage, and execute procedures as follows:
determining information of a group of terminals to be sent; and using, within a set of resources of a group common physical downlink control channel (PDCCH) corresponding to the group of terminals, different subcarrier spaces to send the information of the group of terminals; and
the transceiver configured to receive and send data under a control of the processor;
wherein the different subcarrier spaces comprise subcarrier spaces used by terminals of the group of terminals during sending and receiving of data in the same slot or, the different subcarrier spaces comprise subcarrier spaces corresponding to each slot;
wherein in response to that the different subcarrier spaces comprise subcarrier spaces used by terminals of the group of terminals during sending and receiving of data in the same slot, the using within the set of resources of the group common PDCCH corresponding to the group of terminals, different subcarrier spaces to send the information of the group of terminals comprises:
for any subcarrier space in the slot, using within a set of resources of a group common PDCCH corresponding to the subcarrier space, the subcarrier space to send the information of the group of terminals on the group common PDCCH; or,
wherein in response to that the different subcarrier spaces comprise subcarrier spaces corresponding to each slot, the using within the set of resources of the group common PDCCH corresponding to the group of terminals, different subcarrier spaces to send the information of the group of terminals comprises:
for any slot, using within a set of resources of a group common PDCCH corresponding to the slot, a subcarrier space corresponding to the slot to receive and send the information of the group of terminals on the group common PDCCH.

6. The base station according to claim 5, wherein the processor is configured to execute procedures to: inform terminals of a subcarrier space used for sending a group common PDCCH through an explicit signaling.

7. A terminal, comprising:
a processor configured to send and receive data through a transceiver, read programs in a storage, and executing procedures as follows:
detecting a group common PDCCH corresponding to a group of terminals where the terminal is located; and using, within a set of resources of a group common PDCCH corresponding to the group of terminals, different subcarrier spaces to receive information of the group of terminals sent from a base station; and
the transceiver configured to receive and send data under a control of the processor;
wherein the different subcarrier spaces are subcarrier spaces used by the terminals during sending and receiving of data in the same slot or, the different subcarrier spaces comprise subcarrier spaces corresponding to each slot;
wherein in response to that the different subcarrier spaces are subcarrier spaces used by the terminals during sending and receiving of data in the same slot, the using, within the set of resources of the group common PDCCH corresponding to the group of terminals, different subcarrier spaces to receive the information of the group of terminals sent from the base station comprises:

for any subcarrier space in the slot, using within a set of resources of a group common PDCCH corresponding to the subcarrier space, the subcarrier space to receive the information of the group of terminals on the group common PDCCH; or, wherein in response to that, the different subcarrier spaces comprise subcarrier spaces corresponding to each slot, the using within the set of resources of the group common PDCCH corresponding to the group of terminals, different subcarrier spaces to receive the information of the group of terminals sent from the base station comprises:

for any slot, using within a set of resources of a group common PDCCH corresponding to the slot, a subcarrier space corresponding to the slot to receive the information of the group of terminals sent from the base station on the group common PDCCH.

8. The terminal according to claim 7, wherein a subcarrier space used for sending a group common PDCCH by terminals is informed by a base station through explicit signaling.

* * * * *